United States Patent
Yang et al.

(10) Patent No.: US 9,606,669 B2
(45) Date of Patent: Mar. 28, 2017

(54) IN-CELL TOUCH PANEL AND DISPLAY DEVICE (71) Applicants: BOE TECHNOLOGY GROUP CO., LTD., Beijing (CN); BEIJING BOE OPTOELECTRONICS TECHNOLOGY CO.,LTD., Beijing (CN)

(72) Inventors: Shengji Yang, Beijing (CN); Xiaoliang Ding, Beijing (CN); Xue Dong, Beijing (CN); Haisheng Wang, Beijing (CN); Yingming Liu, Beijing (CN); Weijie Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 14/435,972

(22) PCT Filed: Aug. 7, 2014

(86) PCT No.: PCT/CN2014/083918
§ 371 (c)(1),
(2) Date: Apr. 15, 2015

(87) PCT Pub. No.: WO2015/165165
PCT Pub. Date: Nov. 5, 2015

(65) Prior Publication Data
US 2016/0253036 A1 Sep. 1, 2016

(30) Foreign Application Priority Data

Apr. 29, 2014 (CN) .......................... 2014 1 0178797

(51) Int. Cl.
G06F 3/045 (2006.01)
G06F 3/041 (2006.01)
(Continued)

(52) U.S. Cl.
CPC ...... *G06F 3/0418* (2013.01); *G02F 1/136209* (2013.01); *G06F 3/041* (2013.01);
(Continued)

(58) Field of Classification Search
CPC ...... G06F 3/041; G06F 3/0412; G06F 3/0416; G06F 3/044
See application file for complete search history.

(56) References Cited

U.S. PATENT DOCUMENTS

2006/0097991 A1* 5/2006 Hotelling .............. G06F 3/0416
345/173
2009/0135157 A1 5/2009 Harley
(Continued)

FOREIGN PATENT DOCUMENTS

CN 102566838 A 7/2012
CN 102914920 A 2/2013
(Continued)

OTHER PUBLICATIONS

International Search Report dated Jan. 28, 2015; PCT/CN2014/083918.
(Continued)

Primary Examiner — Towfiq Elahi
(74) Attorney, Agent, or Firm — Ladas & Parry LLP (57) ABSTRACT

An in-cell touch panel and a display device implements touch function and display function by dividing a common electrode layer (110) connected with entire surface in the array substrate (100) to form a plurality of touch driving electrodes (111) and common electrodes (112); providing touch sensing electrodes (210) with a hollowed-out lattice structure over the common electrodes (112); and driving touch driving electrodes (111) in a time division manner. The in-cell touch panel can increase touch sensitivity and guarantee that touch sensing electrodes have small signal delays.

17 Claims, 8 Drawing Sheets (51) Int. Cl.
*G02F 1/1362* (2006.01)
*G09G 3/36* (2006.01)
*G09G 3/20* (2006.01)

(52) U.S. Cl.
CPC ............ *G06F 3/0412* (2013.01); *G09G 3/20* (2013.01); *G09G 3/3655* (2013.01); *G06F 2203/04112* (2013.01); *G09G 2300/0426* (2013.01)

(56) References Cited

U.S. PATENT DOCUMENTS

| | | | |
|---|---|---|---|
| 2012/0218482 A1* | 8/2012 | Hwang | G06F 3/044 349/12 |
| 2014/0104510 A1 | 4/2014 | Wang et al. | |
| 2014/0125626 A1 | 5/2014 | Yang et al. | |
| 2015/0077650 A1 | 3/2015 | Huang et al. | |

FOREIGN PATENT DOCUMENTS

| | | |
|---|---|---|
| CN | 102955635 A | 3/2013 |
| CN | 102955637 A | 3/2013 |
| CN | 103472951 A | 12/2013 |
| CN | 103970354 A | 8/2014 |
| CN | 203825590 U | 9/2014 |

OTHER PUBLICATIONS

Written Opinion of The International Searching Authority dated Jan. 28, 2015; PCT/CN2014/083918.
First Chinese Office Action dated May 6, 2015: Appln. No. 201410178797.4.
First Chinese Office Action issued May 6, 2015; Appln. No. 201410178797.4.
Chinese Office Action issued Sep. 14, 2015; Appln. No. 201410178797.4.
Chinese Notice of Allowance issued Nov. 6, 2015; Appln. No. 201410178797.4.

* cited by examiner

IN-CELL TOUCH PANEL AND DISPLAY DEVICE

TECHNICAL FIELD

Embodiments of the present invention relate to an in-cell touch panel and a display device.

BACKGROUND

With the rapid development of display technology, touch screen panels have become popular in life gradually. At present, touch panels may be classified into add-on touch panels, on-cell touch panels and in-cell touch panels according to their constructions. For an add-on touch panel, the touch panel and the liquid crystal display (LCD) are produced separately and then attached together to become a liquid crystal display with touch function. Add-on touch panels suffer from disadvantages such as high manufacturing costs, low light transmission rate, thick module and the like. For an in-cell touch panel, touch electrodes of the touch panel are embedded in the liquid crystal display, which can reduce the overall thickness of the assembly and significantly reduce manufacturing costs of the touch panel. Therefore, in-cell touch panels have received great attention from panel manufacturers.

At present, liquid crystal display technologies that can realize wide viewing angle mainly include in-plane switch (IPS) technology and advanced super dimension switch (ADS) technology. With the ADS technology, a multidimensional electric field is formed by an electric field generated by edges of slit electrodes in the same plane and an electric field generated between the slit electrode layer and the plate electrode layer to enable liquid crystal molecules of all orientations between slit electrodes inside the liquid crystal cell and right over electrodes to rotate, thereby increasing work efficiency of the liquid crystal and increasing light transmission efficiency. The ADS technology can enhance picture quality of TFT-LCD products and has advantages such as high resolution, high transmittance, low power dissipation, wide viewing angle, high aperture ratio, low chromatic aberration and no push Mura. H-ADS (high aperture ratio-advanced super dimension switch) is one important implementation of ADS technology.

At present, for the in-cell touch panel structure proposed based on ADS and H-ADS technologies, the common electrode layer covering the entire surface in the array substrate is partitioned to form touch driving electrodes and common electrodes insulated from but crossing each other, and touch sensing electrodes corresponding to regions of common electrodes are disposed on the opposed substrate. The touch driving electrodes are driven in a time-division manner to implement touch function and display function.

SUMMARY

At least one embodiment of the present invention provides an in-cell touch panel and a display device to enhance touch sensitivity of a touch panel while guaranteeing that touch sensing electrodes have small signal delay.

At least one embodiment of the present invention provides an in-cell touch panel including: an array substrate having a common electrode layer and an opposed substrate disposed oppositely to the array substrate, wherein the common electrode layer of the array substrate consists of a plurality of touch driving electrodes and a plurality of common electrodes insulated from each other, and the touch driving electrodes and common electrodes are disposed in different directions; the opposed substrate has a plurality of touch sensing electrodes with a hollowed-out lattice structure, orthogonal projections of the touch sensing electrodes on the array substrate face regions of the common electrodes and have consistent outlines with the common electrodes; and in the hollowed-out lattice structure of the touch sensing electrodes, meshes in a central region have greater sizes than meshes in a marginal region.

At least one embodiment of the present invention provides an display device including the above-mentioned touch panel provided in embodiments of the present invention.

BRIEF DESCRIPTION OF DRAWINGS

In order to explain the technical solution of embodiments of the present invention more clearly, accompanying drawings of the embodiments will be introduced briefly below. Obviously, the accompanying drawings in the following description only relate to some embodiments of the present invention rather than limiting the present invention.

FIG. 4b is a three-dimensional structure diagram of touch sensing electrodes and common electrodes in FIG. 4a;

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Thicknesses and shapes of layers in the drawings do not reflect real scale and only serve to illustratively explain contents of the present invention.

The inventors have noted that in order to reduce signal delay (RC loading), touch sensing electrodes in conventional in-cell touch panels are generally manufactured of a metal material of small resistance. And, in order not to influence normal display, touch sensing electrodes are generally made into a hollowed-out lattice structure with meshes of a consistent size and blocked by the black matrix pattern in the opposed substrate. Due to the limitation by the width of the black matrix, linewidth, either longitudinal or transverse, of the lattice structure can not be too big. This structure design can result in relatively small mutual capacitance between touch driving electrodes and touch sensing electrodes. The variation amount caused by finger touch is also relatively small, which in turn influences touch sensitivity.

Figure 1:
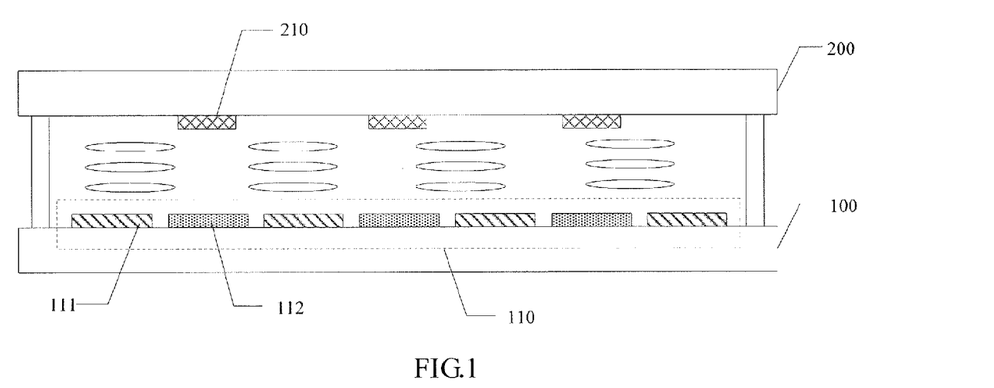
FIG. 1 is a structure diagram of a in-cell touch panel provided in an embodiment of the present invention.

FIG. 1 is a transverse sectional diagram of an in-cell touch panel provided in at least one embodiment of the present invention. An embodiment of the present invention provides an in-cell touch panel as shown in FIG. 1, including an array substrate 100 having a common electrode layer 110 and an opposed substrate 200 disposed oppositely to the array substrate 100.

Figure 2:
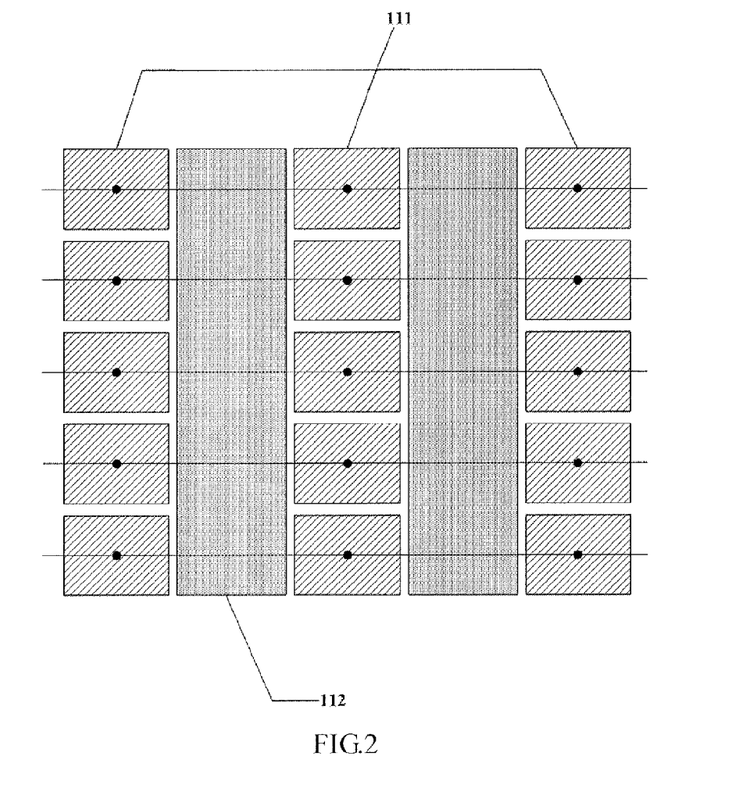
FIG. 2 is a structure diagram of a common electrode layer in an in-cell touch panel provided in an embodiment of the present invention.

As shown in FIGS. 1 and 2, the common electrode layer 110 of the array substrate 100 includes a plurality of touch driving electrodes 111 and a plurality of common electrodes 112 insulated from each other and extending in different directions. In the display period of a frame of image, touch driving electrodes 111 are configured to load common electrode signals and touch scanning signals in a time division manner.

Figure 3A:
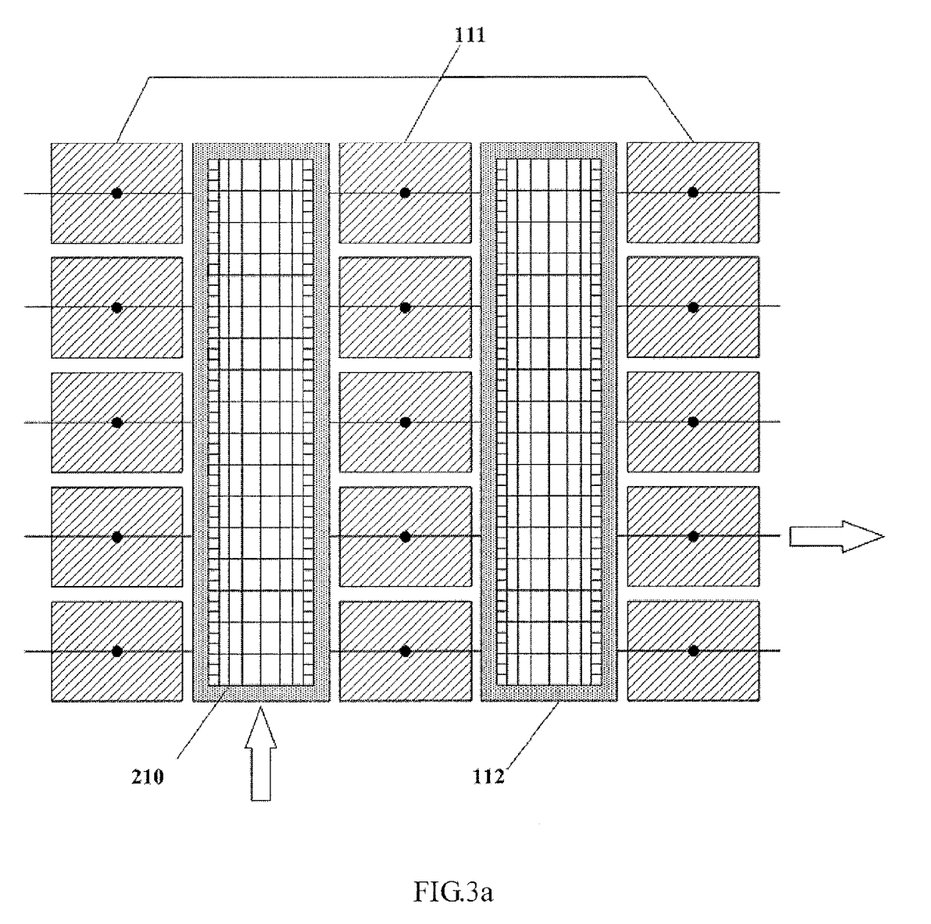
FIG. 3a is a structure diagram of touch sensing electrodes projected onto the common electrode layer in an in-cell touch panel provided in an embodiment of the present invention.
Figure 3B:
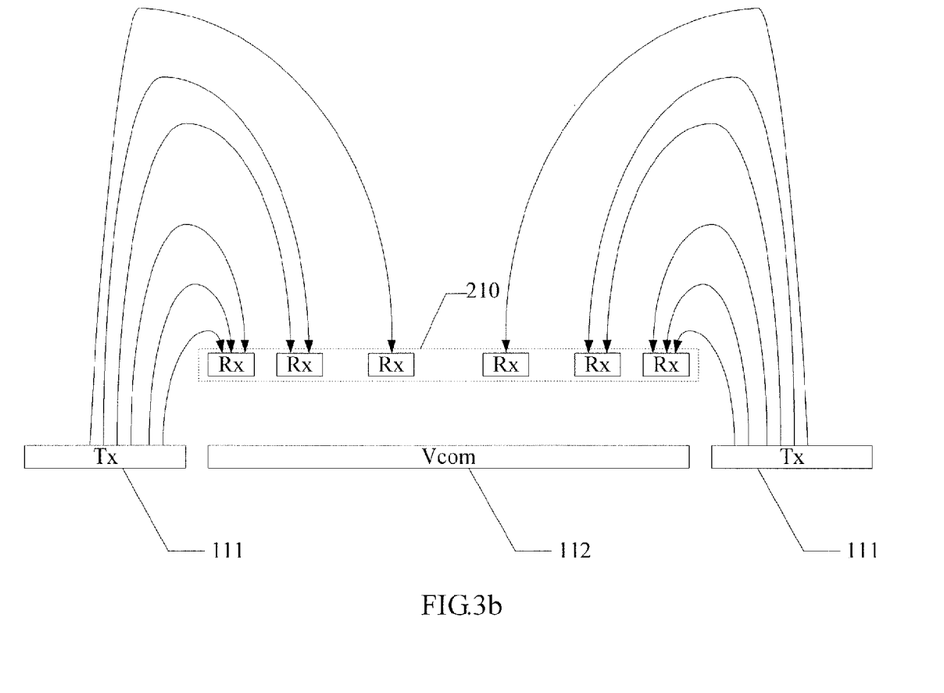
FIG. 3b is a structure side view of touch driving electrodes, touch sensing electrodes and common electrodes in an in-cell touch panel provided in an embodiment of the present invention.

As shown in FIGS. 1, 3a and 3b, extension directions of touch driving electrodes 111 and common electrodes 112 are perpendicular to each other. As shown in FIG. 2, common electrodes 112 extend in the shown longitudinal direction, while touch driving electrodes 111 extend in the shown transverse direction. A touch driving electrode 111 as shown in FIG. 2 includes three driving sub-electrodes disposed in the linear direction shown in FIG. 2, that is, the extension direction of touch driving electrode 111. Of course, touch driving electrodes and common electrodes may also be disposed in other different extension directions that are not limited to those described in the present embodiment.

The opposed substrate 200 has a plurality of touch sensing electrodes 210 with hollowed-out lattice structure. Orthogonal projections of touch sensing electrodes 210 on the array substrate 100 are opposite to regions of common electrodes 112 and coincide with common electrodes 112 in terms of outline/profile. In at least one embodiment, in the hollowed-out lattice structure of touch sensing electrodes 210, meshes in central region have sizes greater than that of meshes in marginal regions, that is, meshes in marginal regions are distributed densely while meshes in central region are distributed sparsely.

With the above-mentioned in-cell touch panel provided in at least one embodiment of the present invention, since patterns of touch sensing electrodes 210 are consistent with outlines of common electrodes 112, and in the hollowed-out lattice structure of touch sensing electrodes 210, meshes in central region have greater sizes than meshes in marginal regions; as shown in FIG. 3b, electric field lines are distributed most densely at locations of touch sensing electrodes close to touch driving electrodes, in order to guarantee electric field projection amount, meshes in marginal regions of touch sensing electrodes 210 are configured denser, which can increase projection capacitance between touch sensing electrodes 210 and touch driving electrodes 111 in marginal regions, and facilitate improving touch sensitivity; while meshes in central region of touch sensing electrodes 210 are configured sparser, which can decrease the overall ground capacitance of touch sensing electrodes 210 and guarantee that touch sensing electrodes have small signal delay.

In the above-mentioned touch panel provided in at least one embodiment of the present invention, sizes of meshes of the touch sensing electrodes 210 may be designed in a gradual change form. As shown in FIG. 3a, in the hollowed-out lattice structure of touch sensing electrodes 210, sizes of meshes may increase from marginal regions to central region. In at least one embodiment of the present invention, the mesh size of touch sensing electrodes 210 may also be designed in a region manner. Each touch sensing electrode 210 is divided into two regions, i.e., a marginal region and a central region. Meshes in the central region have a uniform size, and meshes in the marginal region have a uniform size. Mesh size in the central region is set to be greater than the mesh size in the marginal region. In specific practice, one kind of arrangement may be chosen according to practical design requirement, which is not limited herein.

As stated above, the mesh size of the hollowed-out lattice structure of touch sensing electrodes 210 may be determined according to specific requirements. For example, meshes in marginal region are distributed densely, and therefore the mesh size here may be designed as the size of sub-pixel units in one pixel unit. While meshes in central region are distributed sparsely and therefore the mesh size here may be designed as the size of one pixel unit. According to the type of display panel, each pixel unit may include a plurality of sub-pixel units, for example, three sub-pixel units (RGB) or four sub-pixel units (RGBW).

In the touch panel provided in at least one embodiment of the present invention, a black matrix pattern may be disposed on the opposed substrate or the array substrate. In order to guarantee that touch sensing electrodes 210 will not influence the aperture ratio of pixel units and light transmission rate, the hollowed-out lattice structure of touch sensing electrodes 210 is generally configured to be covered by the black matrix pattern. In this way, it is possible to use the black matrix pattern to cover the hollowed-out lattice structure of touch sensing electrodes 210 while not influencing the aperture ratio of the display nor influencing the light transmission rate of the display.

In at least one embodiment of the present invention, since the touch sensing electrodes 210 of lattice-like electrode structure disposed on the opposed substrate 200 do not block opening regions of the pixel units, the material for touch sensing electrodes 210 may be a transparent conductive oxide such as ITO or IZO, or may be a metal material including metals or alloys. When a metal material is used to manufacture touch sensing electrodes, it is possible to effectively reduce their resistance.

Figure 4A:
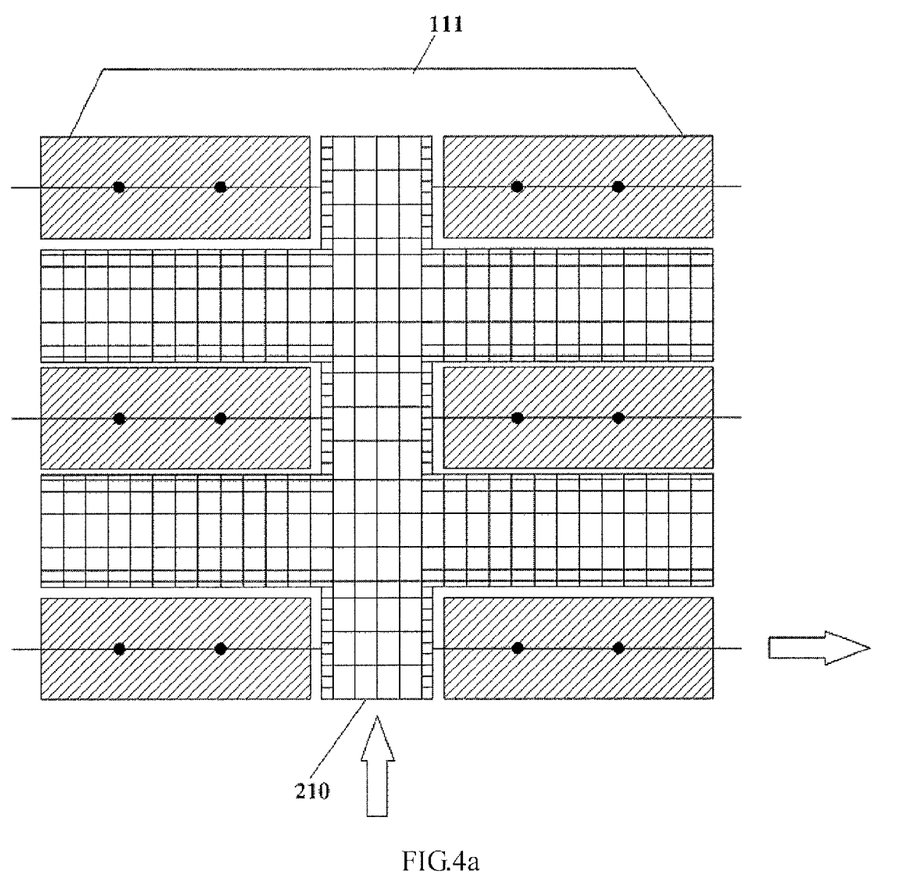
FIG. 4a is a structure diagram of touch sensing electrodes projected onto the common electrode layer in an in-cell touch panel provided in an another embodiment of the present invention.

In at least one embodiment of the present invention, the black matrix pattern has a plurality of opening regions arranged in a matrix. For example, touch driving electrodes 111 extend in the row direction of the opening regions; and touch sensing electrodes 210 and common electrodes 112 extend in the column direction of the opening regions, as shown in FIGS. 3a and 4a; the lower arrowhead is the transmission direction of signals in touch sensing electrodes 210, and the right hand arrowhead is the transmission direction of signals in touch driving electrodes 111. It is also possible to change wiring directions of both according to the size of applying devices, that is, touch driving electrodes 111 are configured to extend in the column direction of the opening regions, while touch sensing electrodes 210 and common electrodes 112 are configured to extend in the row direction of the opening regions. Signal transmission directions of both are accordingly changed, which is not limited herein.

Hereinafter, description will be given with respect to an example in which touch driving electrodes 111 extend in the row direction of opening regions and touch sensing electrodes 210 and common electrodes 112 extend in the column direction of opening regions.

In at least one embodiment of the present invention, since touch driving electrodes 111 and common electrodes 112 are insulated from each other and together constitute the common electrode layer 110, upon specifically designing the common electrode layer, as shown in FIG. 2, common electrodes 112 may be configured as an entire surface electrode, that is, each common electrode 112 is not divided into a plurality of sub-electrodes connected in series by wires. Common electrodes 112 extend in the column direction of opening regions. Touch driving electrodes 111 extend in the row direction of opening regions. Each touch driving electrode 111 includes a plurality of touch driving sub-electrodes disposed in the extension direction of touch driving electrodes 111 each of which is located between adjacent common electrodes 112. For example, FIG. 2 shows a schematic diagram of a touch driving electrode 111 consisting of three touch driving sub-electrodes. Also since outlines of touch sensing electrodes 210 and common electrodes 112 are consistent, as shown in FIG. 3a, the touch sensing electrodes 210 are also entire surface electrodes.

In at least one embodiment of the present invention, upon designing the common electrode layer, it is also possible to configure touch driving electrodes 111 as entire surface electrodes extending in the row direction of opening regions, and configure common electrodes 112 to extend in the column direction of opening regions; each common electrode 112 comprises a plurality of common sub-electrodes, which are each located in a gap between adjacent touch driving sub-electrodes. Here, in order to guarantee there is no direct opposite area between touch sensing electrodes 210 and touch driving electrodes 111, touch sensing electrodes 210 corresponding to common electrodes 112 are also configured to each comprise a plurality of touch sensing sub-electrodes disposed in the same column.

In at least one embodiment of the present invention, because positions of touch sensing electrodes 210 correspond to positions of common electrodes 112, this arrangement prevents direct opposite areas from existing between touch sensing electrodes 210 and touch driving electrodes 111.

Since touch panels generally have a resolution of the order of millimeters, while liquid crystal displays generally have a resolution of micron order, it can be seen that the resolution required for display is much higher than the resolution required for touch, therefore each touch sensing electrode 210 and each common electrode 112 would correspond to a plurality of rows of pixel units. It is possible to set gaps between touch sensing electrodes 210 according to specific touch resolution requirements, that is, it is only required to guarantee that projections of touch sensing electrodes 210 on the array substrate 100 are located in regions of common electrodes 112. The width of touch sensing electrodes 210 is generally not greater than the width of common electrodes 112. For example, as shown in FIG. 3a, one touch sensing electrode 210 may occupy an area slightly smaller than an area of region occupied by a corresponding common electrode 112. As shown in FIG. 4a, one touch sensing electrode 210 may also occupy a region with an area consistent with an area of the region occupied by a corresponding common electrode 112, that is, the touch sensing electrode 210 completely cover the corresponding common electrode 112, which is not limited herein. Touch sensing electrodes 210 may also be disposed to be separated by at least one common electrode 112, and it is also possible to configure touch sensing electrodes 210 and common electrodes 112 in an one-to-one correspondence relationship, which is not limited herein.

Figure 4B:
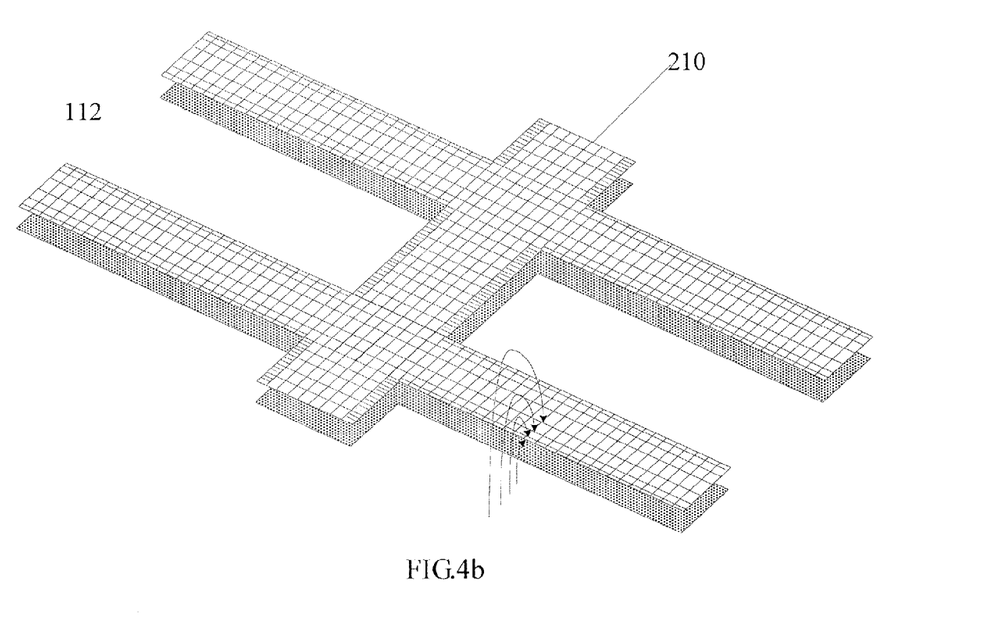

In at least one embodiment of the present invention, upon designing patterns of common electrodes 112 and touch sensing electrodes 210, it is possible to design them in strip electrode shapes, as shown in FIG. 3a. Of course, in order to increase the opposite regions between touch sensing electrodes 210 and touch driving electrodes 111, as shown in FIG. 4a, it is possible to configure common electrodes 112 and touch sensing electrodes 210 as a wing-like pattern. FIG. 4b shows a three dimensional schematic diagram of touch sensing electrodes 210 and common electrodes 112 shown in FIG. 4a, in which the arrowhead denotes electric field lines between touch driving electrodes 111 and touch sensing electrodes 210.

Figure 5A:
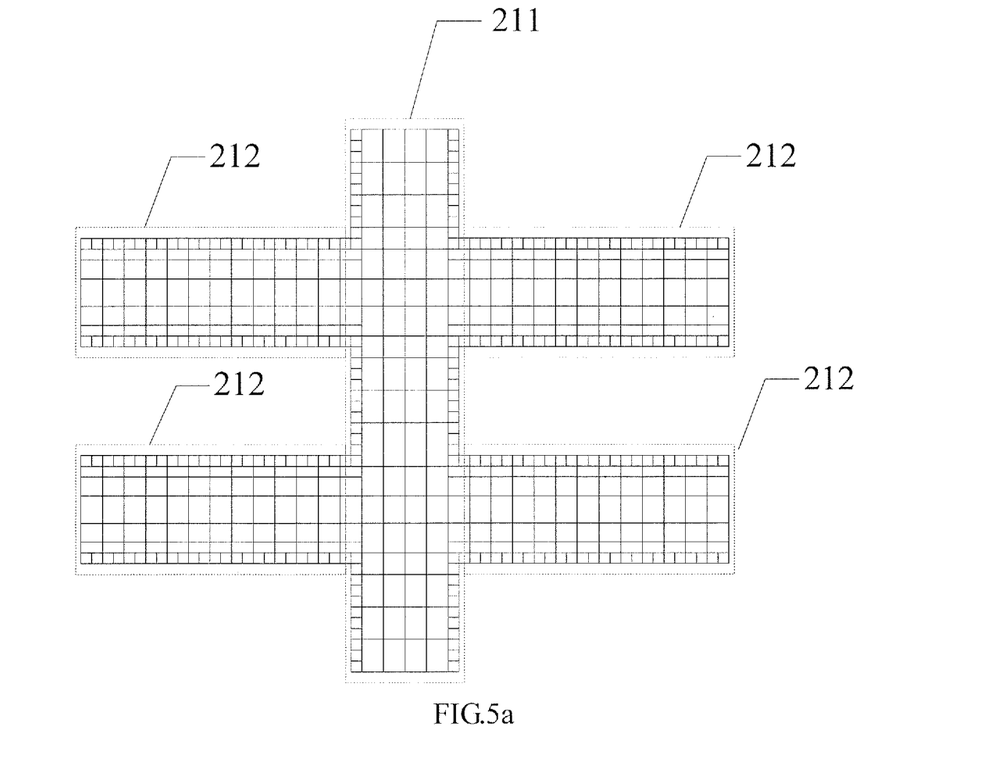
FIGS. 5a and 5b are structure diagrams of touch sensing electrodes in an in-cell touch panel provided in yet another embodiment of the present invention.
Figure 5B:
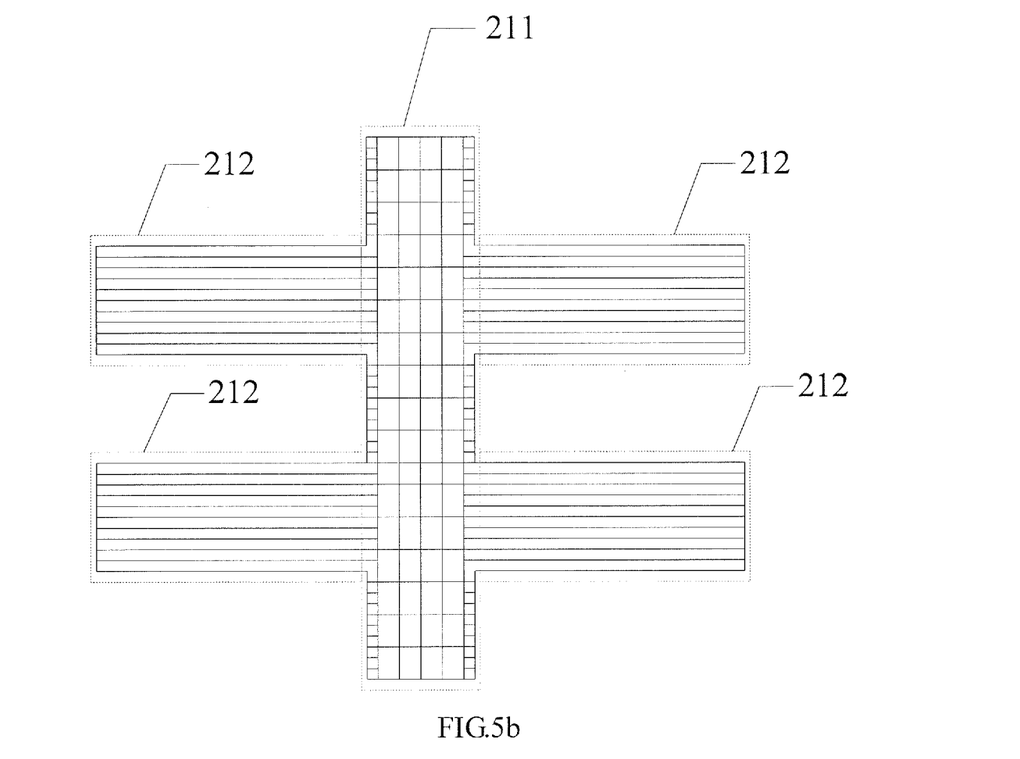

In at least one embodiment of the present invention, as shown in FIGS. 5a and 5b, a touch sensing electrode 210 may include a central sub-electrode 211 and a plurality of branch sub-electrodes 212 connected with the central sub-electrode 211 and located on both sides of its extension direction.

For example, in order to guarantee that patterns are relatively uniformly distributed on the opposed substrate 200, branch sub-electrodes 212 in a touch sensing electrode 210 are generally symmetrically distributed on both sides of the central electrode 211, as shown in FIGS. 5a and 5b.

As shown in FIG. 5a, in the wing-like pattern of the touch sensing electrodes 210, in the hollowed-out lattice structure of the central sub-electrode 210 and branch sub-electrodes 212, the mesh sizes in the central region are all greater than those in marginal region.

As shown in FIG. 5b, in the wing-like pattern of the touch sensing electrodes 210, in the hollowed-out lattice structure of the central sub-electrode 210, the mesh sizes in the central region are greater than those in marginal region; while mesh sizes in the hollowed-out lattice structure of branch sub-electrode 212 are consistent. The process of configuring mesh sizes in branch sub-electrodes as being consistent can guarantee the homogeneity of the overall patterns of touch sensing electrodes.

Data simulation will be carried out hereinafter for touch sensing electrodes 210 with wing-like pattern in the above-mentioned two embodiments provided in embodiments of the present invention and touch sensing electrodes with wing-like pattern having uniform mesh size are described as a comparative example. In the first embodiment, mesh sizes in the marginal region and mesh sizes in the comparative example are consistent with an average mesh length of 6 μm and a width of 3 μm. The central sub-electrodes in the first embodiment and the second embodiment are identical to each other, the specific structure of branch sub-electrodes in the first embodiment is shown in FIG. 5a, and the specific structure of the branch sub-electrodes in the second embodiment is shown in FIG. 5b. Simulation parameters are shown in the following table:

| Simulation conditions | C (Tx and Rx) | | | C (Rx and Vcom) |
|---|---|---|---|---|
| | With finger touch | Without finger touch | ΔC | |
| Comparative example | 0.34186 | 0.38005 | 0.03819 | 14.887 |

-continued

| Simulation conditions | C (Tx and Rx) | | | C (Rx and Vcom) |
|---|---|---|---|---|
| | With finger touch | Without finger touch | ΔC | |
| First embodiment | 0.20265 | 0.24004 | 0.03739 | 10.465 |
| Second embodiment | 0.20244 | 0.24004 | 0.03760 | 9.221 |

As can be seen from the simulation results, given a basically constant touch variation (ΔC), the ground capacitance C (Rx and Vcom) is significantly reduced from 14.887 to 10.465 and 9.221. As can be seen from the analysis with respect to the data, the area of meshes in the central region of the touch sensing electrodes doesn't play a critical role for changing the touch variation, while the area of regions near touch sensing electrodes and touch driving electrodes, namely the area of marginal region of the touch sensing electrodes, plays a critical role for changing the touch variation. Therefore, in the above-mentioned touch panel provided in embodiments of the present invention, increasing the mesh density in marginal regions of touch sensing electrodes and reducing the mesh density in central regions at the same time can reduce the ground capacitance and hence reducing signal delay of touch sensing electrodes while guaranteeing the touch variation amount.

In the above-mentioned touch panel provided in at least one embodiment of the present invention, time division driving is used for touch and display phases, which on one hand can integrate chips for display driving and touch driving in one piece, thereby reducing production costs, and on the other hand can also reduce mutual interference between display and touch, thereby enhancing picture quality and touch accuracy.

Figure 6:
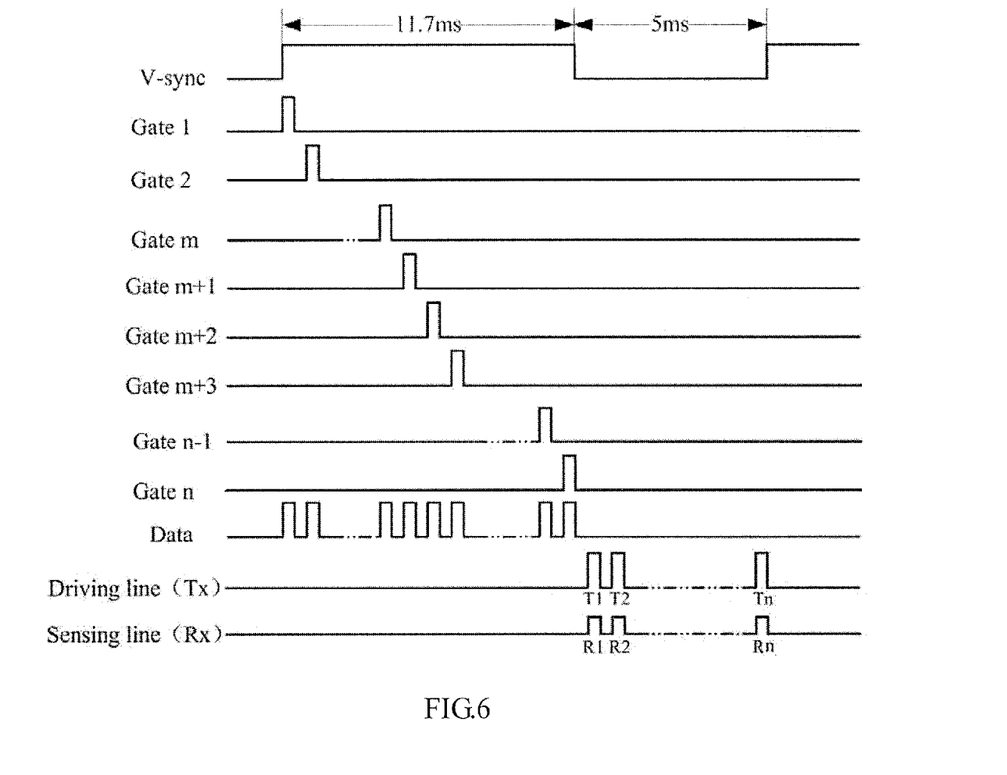
FIG. 6 is a driving timing diagram of an in-cell touch panel provided in an embodiment of the present invention.

For example, in the driving timing diagram shown in FIG. 6, the period for the touch panel to display every frame (V-sync) is divided into a display time period (Display) and a touch time period (Touch). For example, in the driving timing diagram shown in FIG. 6, the time period for the touch panel to display a frame of image is 16.7 ms, in which 5 ms is chosen as the touch time period and the remaining 11.7 ms is used as the display time period. Of course, it is also possible to properly adjust the durations of both time periods according to the processing capacity of IC chips, which is not limited herein. In the display time period (Display), gate scanning signals are applied in turn to gate signal lines Gate 1, Gate 2 . . . Gate n in the touch panel, and gray scale signals are applied to data signal line Data, and accordingly touch driving electrodes Tx at this time serving as common electrodes are supplied with constant common electrode signals by the IC chips connected with touch driving electrodes, to thereby implement liquid crystal display function. In the touch time period (Touch), IC chips connected with touch driving electrodes supply touch scanning signals T1, T2 . . . Tn to touch driving electrodes respectively, and at the same time touch sensing electrodes detect touch sensing signals R1, R2, . . . Rn respectively to implement touch function. In the touch time period, no signal is input to each gate signal line and data signal line in the touch panel. Common electrodes in the common electrode layer constantly load common electrode signals in the display time period and in the touch time period. Alternatively, common electrodes are loaded with common electrode signals in the display time period and are grounded or suspended in the touch time period which means no signal is input.

At least one embodiment of the present invention further provides a display device including the above-mentioned in-cell touch panel provided in embodiments of the present invention. The display device may be any products or components with touch and display functions such as cell phones, tablets, TV sets, displays, notebook computers, digital picture frames, and navigators. The embodiments of the above-mentioned in-cell touch panel may be referred to for the implementations of the display device, and repetitions will not be described any more herein.

The above-mentioned in-cell touch panel and display device provided in embodiments of the present invention implement touch function and display function by dividing the common electrode layer covering the entire surface in the array substrate to form a plurality of touch driving electrodes and a plurality of common electrodes insulated from each other and extending in different directions; providing touch sensing electrodes with hollowed-out lattice structure on the opposed substrate which have orthogonal projections on the array substrate opposite to regions of common electrodes and having consistent outlines with common electrodes; and driving touch driving electrodes in a time division manner. Since in the touch panel provided in embodiments of the present invention, patterns of touch sensing electrodes have consistent outlines with common electrodes, and in the hollowed-out lattice structure of touch sensing electrodes, meshes in the central region have bigger sizes than meshes in the marginal region; thus meshes in marginal regions of the touch sensing electrodes are distributed more densely. Therefore, it is possible to increase projection capacitance between touch sensing electrodes and touch driving electrodes in marginal regions, which facilitates enhancing the touch sensitivity. While meshes of touch sensing electrodes in the central region are distributed relatively sparsely, which could reduce the overall ground capacitance of touch sensing electrodes and guarantee that touch sensing electrodes have small signal delays.

What are described above is related to the illustrative embodiments of the disclosure only and not limitative to the scope of the disclosure; the scopes of the disclosure are defined by the accompanying claims.

The present application claims the priority of China Patent application No. 201410178797.4 filed on Apr. 29, 2014, which is incorporated by reference in its entirety herein as part of the present application.

The invention claimed is:

1. An in-cell touch panel comprising: an array substrate having a common electrode layer and an opposed substrate disposed oppositely to the array substrate, wherein:
   the common electrode layer of the array substrate comprises a plurality of touch driving electrodes and a plurality of common electrodes insulated from each other, and the touch driving electrodes and the common electrodes extend in different directions; in a display period of a frame of image, the touch driving electrodes are configured to load common electrode signals and touch scanning signals in a time division manner;
   the opposed substrate has a plurality of touch sensing electrodes with a hollowed-out lattice structure, orthogonal projections of the touch sensing electrodes on the array substrate face regions of the common electrodes and have consistent outlines with the common electrodes; and in the hollowed-out lattice structure of the touch sensing electrodes, meshes in a central region have greater sizes than meshes in a marginal region, wherein a black matrix pattern is provided on the array substrate or the opposed substrate and the hollowed-out lattice structure of the touch sensing electrodes are covered by the black matrix pattern, wherein the black matrix pattern has a plurality of opening regions arranged in a matrix; the touch driving electrodes extend in a row direction of the opening regions; the touch sensing electrodes and the common electrodes extend in a column direction of the opening regions; or the touch driving electrodes extend in a column direction of the opening regions, and the touch sensing electrodes and the common electrodes extend in a row direction of the opening regions.

2. The touch screen of claim 1, wherein in the hollowed-out lattice structure of the touch sensing electrodes, sizes of meshes increase gradually from the marginal region to the central region.

3. The touch panel of claim 1, wherein the common electrodes are entire surface electrodes; each of the touch driving electrodes comprises a plurality of touch driving sub-electrodes disposed in an extension direction of the touch driving electrodes, and each of the touch driving sub-electrodes is located between adjacent ones of the common electrodes.

4. The touch screen of claim 3, wherein the touch sensing electrode comprises a central sub-electrode and a plurality of branch sub-electrodes connected with the central sub-electrode and located on both sides of its extension direction.

5. The touch screen of claim 4, wherein the branch sub-electrodes are symmetrically distributed on both sides of the extension direction of the central sub-electrode.

6. The touch screen of claim 4, wherein in the hollowed-out lattice structure of the central sub-electrode, meshes in the central region have greater sizes than meshes in the marginal region; and meshes in the hollowed-out lattice structure of branch sub-electrodes have a consistent size.

7. The touch screen of claim 4, wherein in the hollowed-out lattice structure of the central sub-electrode and the branch sub-electrodes, sizes of meshes in the central region are all greater than sizes of meshes in the marginal region.

8. A display device comprising the touch panel of claim 1.

9. The touch screen of claim 2, wherein a black matrix pattern is provided on the array substrate or the opposed substrate and the hollowed-out lattice structure of the touch sensing electrodes are covered by the black matrix pattern.

10. The touch screen of claim 9, wherein the black matrix pattern has a plurality of opening regions arranged in a matrix;

the touch driving electrodes extend in a row direction of the opening regions; the touch sensing electrodes and the common electrodes extend in a column direction of the opening regions; or the touch driving electrodes extend in a column direction of the opening regions, and the touch sensing electrodes and the common electrodes extend in a row direction of the opening regions.

11. The touch screen of claim 5, wherein in the hollowed-out lattice structure of the central sub-electrode, meshes in the central region have greater sizes than meshes in the marginal region; and meshes in the hollowed-out lattice structure of branch sub-electrodes have a consistent size.

12. The touch screen of claim 5, wherein in the hollowed-out lattice structure of the central sub-electrode and the branch sub-electrodes, sizes of meshes in the central region are all greater than sizes of meshes in the marginal region.

13. The touch panel of claim 2, wherein the common electrodes are entire surface electrodes; each of the touch driving electrodes comprises a plurality of touch driving sub-electrodes disposed in an extension direction of the touch driving electrodes, and each of the touch driving sub-electrodes is located between adjacent ones of the common electrodes.

14. The touch screen of claim 13, wherein the touch sensing electrode comprises a central sub-electrode and a plurality of branch sub-electrodes connected with the central sub-electrode and located on both sides of its extension direction.

15. The touch screen of claim 14, wherein the branch sub-electrodes are symmetrically distributed on both sides of the extension direction of the central sub-electrode.

16. The touch screen of claim 14, wherein in the hollowed-out lattice structure of the central sub-electrode, meshes in the central region have greater sizes than meshes in the marginal region; and meshes in the hollowed-out lattice structure of branch sub-electrodes have a consistent size.

17. The touch screen of claim 14, wherein in the hollowed-out lattice structure of the central sub-electrode and the branch sub-electrodes, sizes of meshes in the central region are all greater than sizes of meshes in the marginal region.

* * * * *